United States Patent [19]

Meador

[11] Patent Number: 4,576,094
[45] Date of Patent: Mar. 18, 1986

[54] FABRICATION OF EXPANDABLE POLYSTYRENE PLASTIC IGNITION CONTAINERS

[75] Inventor: Jacqueline C. Meador, Huntsville, Ala.

[73] Assignee: The United States of America as represented by the Secretary of the Army, Washington, D.C.

[21] Appl. No.: 770,050

[22] Filed: Aug. 28, 1985

[51] Int. Cl.⁴ ............................................. F42B 3/10
[52] U.S. Cl. ........................ 102/202.12; 102/202.7; 102/275.6; 102/202.14; 102/275.12; 102/331; 102/275.11
[58] Field of Search ............ 102/202.7, 202.12, 202.14, 102/275.6, 275.11, 275.12, 331

[56] References Cited

U.S. PATENT DOCUMENTS

| | | | |
|---|---|---|---|
| 4,023,996 | 5/1977 | Leneve | 149/19.91 X |
| 4,039,640 | 8/1977 | Leneve | 149/100 X |
| 4,383,468 | 5/1983 | Sie et al. | 102/496 X |
| 4,416,710 | 11/1983 | Anderson | 149/19.91 |
| 4,420,931 | 12/1983 | Anderson | 149/19.92 X |
| 4,466,330 | 8/1984 | Juretzek et al. | 102/529 X |
| 4,537,133 | 8/1985 | Mainiero | 102/323 X |

Primary Examiner—Peter A. Nelson
Attorney, Agent, or Firm—Anthony T. Lane; Robert P. Gibson; Freddie M. Bush

[57] ABSTRACT

A method of fabrication of expandable polystyrene plastic ignition container is disclosed which yields an electric squib case and an ignitor charge case which can be easily loaded with a pyrotechnic charge and an ignitor charge respectively, and when in combination, serves as the ignitor system for a high length to diameter flight motor.

The method of fabrication employs expandable polystyrene beads in a first predetermined amount of polystyrene beads which are first pre-expanded to about three times their original size. A second predetermined amount of expandable polystyrene beads are combined with the pre-expanded beads; the combined beads are added to a mold of the desired shape; and the mold is placed in a steam chamber to expand the combined beads to form either the squib case or ignitor charge case. The squib case and the ignitor charge case when mated as an ignitor system for a rocket motor each has the weight, density, and strength to remain in tact during an ignition phase but subsequently breaks up into small pieces which does not inflict damage to propellant in the rocket motor or cause plugging of nozzle when in operation.

4 Claims, 9 Drawing Figures

FABRICATION OF EXPANDABLE POLYSTYRENE PLASTIC IGNITION CONTAINERS

DEDICATORY CLAUSE

The invention described herein may be manufactured, used, and licensed by or for the Government for governmental purposes without the payment to me of any royalties thereon.

BACKGROUND OF THE INVENTION

An ignitor for a rocket motor is generally housed in a case. For rapid ignition, it is necessary that the ingnitor case be strong enough to remain in tact until all parts of the charge has ignited. Also, it is necessary that the ignitor case break into fairly small pieces so that plugging of the nozzle will not occur. Nozzle plugging not only creates a safety hazard, but also causes momentary unbalance of the thrust forces and leads to an increase in dispersion.

An object of this invention is to provide a process for manufacturing an ignitor case of high strength material which permits the loading with an ignitor charge to achieve the shortest ignition delay that is compatable with resonably low impact stress on the propellant grain following case break-up.

A further object of this invention is to provide a process for manufacturing an ignitor case of high strength material which enables the ignitor case to be easily fabricated so that loading and compacting of the ignitor charge can be easily achieved.

SUMMARY OF THE INVENTION

An electric squib case and an ignitor charge case for a high length to diameter flight motor is fabricated from an expandable polystyrene by a process to achieve the proper combination of weight, density, and strength while benefiting from a pressurizing time advantage over the previous method.

The process of this invention comprises placing a first predetermined weight (4.5 ounces) of expandable polystyrene beads into boiling water. After the beads are pre-expanded to approximately three times their original size, the excess water is drained off. A second predetermined weight (10 ounces) of expandable polystyrene beads is then combined with the first predetermined weight of pre-expanded polystyrene beads and mixed thoroughly to yield twinned polystyrene beads. The twinned polystyrene beads are then placed into aluminum casting molds which are subsequently placed into a (2 liter) aluminum steam chamber. The steam chamber is pressurized at 250° F. with 15 psig steam for about three minutes; then the casting molds are removed from the steam chamber, and cooled in cold water for one minute. After cooling, the ignitor cases are removed from the casting mold. The overall process has a pressurizing time advantage over the previous method while yielding an ignitor case having the desired weight, density, and strength required for an ignitor case employed in a high length to diameter rocket motor.

DESCRIPTION OF THE PREFERRED EMBODIMENTS

Figure 1:
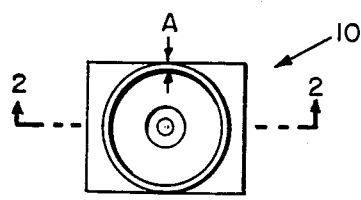
FIG. 1 is a top elevation view of a polystyrene electric squib case manufactured by a previous method.
Figure 3:
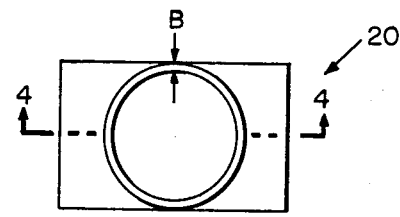
FIG. 3 is a top elevation view of a polystyrene ignitor charge case manufactured by a previous method.
Figure 2:
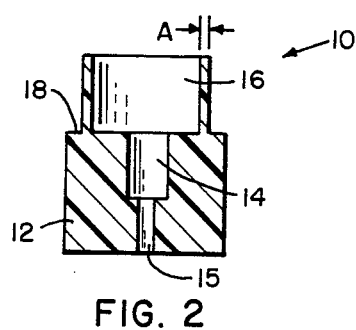
FIG. 2 is a cross sectional view taken along line 2—2 of FIG. 1 of a polystyrene electric squib case manufactured by a previous method.
Figure 4:
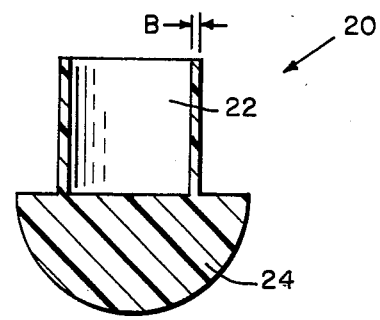
FIG. 4 is a cross sectional view taken along line 4—4 of FIG. 3 of a polystyrene ignitor charge case manufactured by a previous method.
Figure 5:
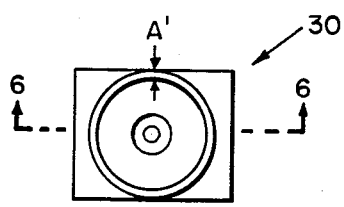
FIG. 5 is a top elevation view of the polystyrene electric squib case manufactured by the method of this invention.
Figure 7:
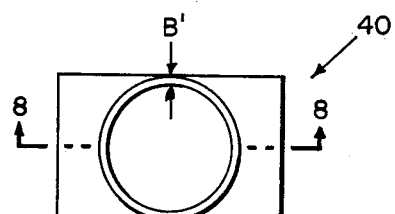
FIG. 7 is a top elevation view of a polystyrene ignitor charge case manufactured by the method of this invention.

In further relating the figures of the drawing to the prior manufacturing method and the manufacuring method of this invention, the following Table I is presented wherein A of FIGS. 1 and 2 and B of FIGS. 3 and 4 depict wall thicknesses in millimeters for an electric squib case and an ignitor charge case respectively made by prior manufacturing method. The weights in grams of the electric squib case and the ignitor charge case are shown for cases designated 10 and 20 for FIGS. 1 and 2 and FIGS. 3 and 4 respectively. Similarly, in FIGS. 5 and 6 and FIGS. 7 and 8, the wall thicknesses in millimeters for an electric squib case and ignitor charge cases are designated A' and B' respectively, and the electric squib cases and the ignitor charge cases, weights in grams, are shown for cases designated 30 and 40 for FIGS. 5 and 6 and FIGS. 7 and 8 respectively.

Figure 6:
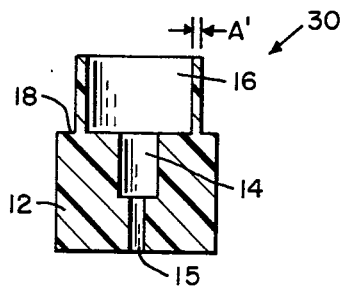
FIG. 6 is a cross sectional view taken along line 6—6 of FIG. 5 of the polystyrene electric squib case manufactured by the method of this invention.
Figure 8:
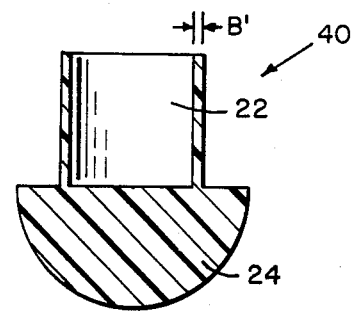
FIG. 8 is a cross sectional view taken along line 8—8 of FIG. 7 of the polystyrene ignitor charge case manufactured by the method of this invention.

The electric squib ignitor cases 10 of FIG. 2 and 30 of FIG. 6 with housing compartments 14, 15, and 16 are shown in relation to the housing base 12 of FIGS. 2 and 6 for receiving an electric squib (not shown) of the pyrotechnic coated ignitor wire type. The ignitor charge cases 20 of FIG. 4 and 40 of FIG. 8 are designed with a housing compartment 22 in relation to the housing base 24 for receiving an ignitor charge (not shown).

Figure 9:
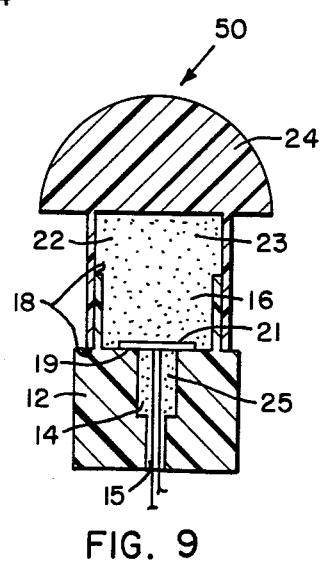
FIG. 9 is a cross sectional view of the composite assembly of the electric squib case of FIG. 5 and the ignitor charge case of FIG. 7 mated together and containing the electric squib and the ignitor charge of the ignition system of this invention.

The electric squib case and the ignitor charge case are shown in FIG. 9 in a mated mode and secured at points of contact 18 with a high strength polyurethane adhesive. The high strength polyurethane adhesive is applied at time of assembling of the electric squib which has been previously installed in electric squib case housing base 12 with a high strength polyurethane adhesive applied at point 19 to secure squib to squib case. The assembly shown as an ignitor system 50 in FIG. 9 contains the appropriate electric squib 21 with lead wires extending through housing compartments 14 and 15 and ignitor charge 23 contained in housing compartment 22. A donor pyrotechnic charge 25 is an optional feature to facilitate ignition of the ignitor charge 22. Since compartment 16 houses the pyrotechnic coated ignitor wire, compartment 14 houses an optional pyrotechnic charge, and compartment 22 houses the ignitor charge 23, intimate contact between the ignitor wire 21, the optional donor charge 25, and the ignitor charge 23 is ensured to facilitate desired ignition reliability when the two cases with contents are mated as illustrated in FIG. 9. In a typical use the rounded-mushroom-shaped portion fits the contour of a rocket motor front end closed with an end cap closure (not shown) while the cylindrically shaped compartment containing the ignitor charge and the cylindrically shaped electric squib case is easily fitted within the propellant grain cavity for easy ignition. The small, light weight particles from the disintegrated cases are discharged out the nozzle in the rocket motor without inflicting damage to the propellant grain or causing plugging of the nozzle during operation.

TABLE I

| Ignitor Case Construction | | | | | | |
|---|---|---|---|---|---|---|
| Ignitor Case* | Pressurizing Time, Minutes | Man Hours | Case No. | Weight, Grams | | Wall Thickness Millimeter |
| Previous Method | 100 | 10 | 16.7 | 10 | −.5 g–1.0 | A | .75 |
|  |  |  |  | 20 | .95 g–2.2 | B | .100 |
| Invention Method | 200 | 3 | 5 | 30 | 1.5 | A' | .125 |
|  |  |  |  | 40 | 3.2 | B' | .175 |

*Comprised of electric squib case 10 or 30 as shown in FIGS. 1, 2, 5 and 6 and ignitor charge case 20 or 40 as shown in FIGS. 3, 4, 7, and 8.

The preferred method of manufacturing of an electric squib case and an ignitor charge case for a high length to diameter flight motor yields the proper combination of weight, density, and strength of the finished product while benefiting from the reduced pressurizing time over the previous method as shown in the above Table I.

The method of manufacturing comprises placing a first predetermined weight (4.5 ounces) of expandable polystyrene beads into boiling water, allowing the beads to expand to approximately three times their original size and draining the excess water off. A second predetermined weight of preexpanded polystyrene beads and mixed thoroughly to yield twinned polystyrene beads. The twinned polystyrene beads are then placed into aluminum casting molds. The aluminum casting molds containing the twinned beads are then placed into a (2 liter) aluminum steam chamber. The steam chamber is pressurized at 250° F. with 15 psig steam for about three minutes; the casting molds are removed from the steam chamber, and cooled in cold water for one minute. After cooling, the ignitor cases are removed from the casting mold. The electric squib case portion and the ignitor charge case portion are now ready for loading with an electric squib ignitor component and ignitor charge formulation based on the requirements of the system wherein used.

The expandable polystyrene is available as minute spherical beads ranging in size designations by cup sizes A, B, C, T, and X. The cup sizes vary from A, the largest to X, the smallest. The preferred size for use in the processing parameters of this invention is cup size C or an intermediate sized bead. Larger beads require more time for expansion whereas small beads would require less time. The C cup size bead for applicant's method and product end use is the preferred size for the ignitor system employing an electric squib case and an ignitor charge case in combination for high length to diameter rocket flight motors.

In referring to Table I for ignitor case construction, electric squib case 10 manufactured by previous method, has a wall A of thickness of about 0.75 mm, and a weight which varies from 0.75–1.0 gram whereas the wall A' thickness of the electric squib case 30 manufactured by applicant's invention method is about 0.125 mm and the weight is consistently about 1.5 grams.

Now referring again to Table I the ignitor charge case 20, manufactured by the previous method, has a wall B of thickness of about 0.100 mm, and a weight which varies from about 0.95 to about 2.2 grams whereas the wall B' thickness of the ignitor charge case 40 manufactured by the invention method is about 0.175 mm and the total weight is consistently about 3.2 grams.

Also, the savings of a 70% reduction in pressurizing time and a reduction in man hours from 16.7 to about 5 for producing a superior product are meritorious achievements which are unexpected and a result of the invention as disclosed herein. The differences between the previous cases manufactured by a previous method, other than the wall thicknesses and constant weights for the cases of this invention as compared to variable weight differences of cases manufactured by the previous method, are definable only for the invention cases in terms of the process steps and the materials employed for making the electric squib and the ignitor charge cases of this invention. The performance of the high strength material to stay in tact, but subsequently disintegrate to fine particles that can be discharged through the nozzle was not a characteristic of the cases made by the previous method, but it is a strong characteristic of the cases made by the present invention method.

For convenience Table II sets forth the processing steps and parameters for manufacturing expandable polystyrene plastic ignitor containers in accordance with this invention.

TABLE II

| Processing Parameters | | |
|---|---|---|
| Step No. | | Procedure |
| Part A | First Quantity of Expandable Polystyrene beads | |
| 1. | 4.5 ounces | |
| 2. | | place beads in boiling water and expand to three times original volume |
| 3. | | drain off excess water |
| Part B | Second quantity of expandable polystyrene beads | |
| 1. | 10 ounces | |
| 2. | | combine with first quantity and mix thoroughly to yield twinned polystyrene beads (pre-expanded and polystyrene beads as received) |
| 3. | | place twinned beads into an aluminum casting mold |
| 4. | | place mold containing twinned beads into a steam chamber |
| 5. | | pressurize to 250° F. with 15 psig steam for about three minutes |
| 6. | | remove mold and place in cold water for one minute |
| 7. | | after cooling, remove polystyrene plastic ignitor containers from |

| TABLE II-continued | |
|---|---|
| Processing Parameters | |
| Step No. | Procedure |
| | mold. The electric squib case portion or the ignitor charge case portion is now ready for loading with a squib ignitor charge formulation based as the requirements of the system wherein it is used. |

The ignitor case of high strength material gives the shortest ignition delay compatable with reasonably low impact stress on the propellant grain. The electric squib holder serves to hold the electric squib in contact with its charge, during the second phase of ignition. The ignitor charge case, in addition to being easily mated with the electric squib portion, is also easy to fabricate so that loading and compacting of the charge is done simply. To mate the ignitor charge portion 40 with electric squib portion 30, a compatible adhesive is applied to the polystyrene exposed surfaces so that the electric squib is positioned adjacent the ignitor charge case portion and in intimate contact with an ignitor charge loaded in ignitor charge case.

The method disclosed herein produces a product particularly useful in a high length to diameter rocket motor where the weight, density, and strength of the ignitor casings have rigid requirements for safe operation by soldier personnel. Experimentally a total of 225 high length to diameter rocket motors employing the ignitor case of this invention have been fired, and there was no evidence of nozzle plugging, propellant damage, or other failures of the systems attributed to improper break-up relating to the ignitor case fabricated as disclosed by applicant.

I claim:

1. A method for fabrication of an expandable polystyrene plastic ignition container, said container having the weight, density, and strength requirements to function in a high length to diameter rocket flight motor and to remain intact until all parts of a contained ignitor charge is ignited and which said expandable polystyrene plastic ignition container subsequently breaks up into small pieces to that plugging of the nozzle of said rocket flight motor does not occur, said method comprising completing the method steps set forth under parts A, B, and C stages as follows:

Part A, pre-expanding stage consisting of:
(i) selecting a first predetermined quantity of a heat expandable polystyrene in the form of minute unexpanded beads;
(ii) placing said predetermined quantity of heat expandable beads in boiling water;
(iii) expanding said beads to approximately three times their original size;
(iv) draining off excess water;

Part B, blending stage consisting of:
(i) selecting a second predetermined quantity of a heat expandable polystyrene in the form of minute beads;
(ii) combining said first predetermined quantity of a heat expandable polystyrene in said pre-expanded form with said second predetermined quantity of a heat expandable polystyrene and mixing thoroughly to yield a twinned polystyrene beads blend consisting of about 4.5 parts by weight of said pre-expanded polystyrene beads and of about 10 parts by weight of said heat expandable polystyrene in the form of minute beads; and, Part C, molding and heat forming stage consisting of:
(i) adding a predetermined quantity of said blend of twinned polystyrene beads into a casting mold of a predetermined shape for said ignitor casting container component;
(ii) placing said mold containing said twinned polystyrene beads into a steam chamber;
(iii) admitting steam to said steam chamber to pressurize to 250° F. with 15 psig steam;
(iv) retaining said mold containing said twinned polystyrene beads under said pressurized steam for about three miutes;
(v) removing said mold from said steam chamber;
(vi) placing said mold containing said twinned polystyrene beads in an expanded stage into cold water for about one minute; and
(vii) removing polystyrene plastic ignitor casing container from said mold.

2. The method for fabrication of an expandable polystyrene plastic ignition container as defined in claim 1 wherein said expandable polystyrene plastic ignition container is an electric squib case having a wall thickness of about 0.125 millimeters for containing a pyrotechnic charge and wherein said electric squib case has a weight in the range of about 1.5 grams.

3. The method for fabrication of an expandable polystyrene plastic ignition container as defined in claim 1 wherein said expandable polystyrene plastic ignition container is an ignitor charge case having a wall thickness of about 0.175 millimeters for containing an ignitor charge formulation and wherein said ignitor charge case has a weight in the range of about 3.2 grams.

4. An ignitor system for a high length to diameter flight rocket motor comprising an electric squib case containing a pyrotechnic charge in combination with an ignitor charge case containing an ignitor charge, said electric squib case fabricated from an expandable polystyrene plastic in the form of pre-expanded beads in a ratio of about 4.5 parts by weight to about 10 parts by weight of polystyrene beads that are processed by heating after being mixed and placed in a mold that is placed in a steam chamber and processed for a predetermined time period, cooled, removed, and subsequently loaded with a pyrotechnic charge, said electric squib case wall thickness being about 0.125 millimeters and said electric squib case weight being about 1.5 grams, said ignitor charge cases fabricated from an expandable polystyrene plastic employing a like process as defined hereinabove for said electric squib case, said ignitor charge case having a wall thickness of about 0.175 millimeters and a weight of about 3.2 grams.

* * * * *